(12) United States Patent
Chopade et al.

(10) Patent No.: US 10,208,233 B2
(45) Date of Patent: Feb. 19, 2019

(54) DUST CONTROL IN OIL FIELD APPLICATIONS

(71) Applicant: Halliburton Energy Services, Inc., Houston, TX (US)

(72) Inventors: Prashant D. Chopade, Kingwood, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/569,703

(22) PCT Filed: Aug. 5, 2015

(86) PCT No.: PCT/US2015/043839
§ 371 (c)(1),
(2) Date: Oct. 26, 2017

(87) PCT Pub. No.: WO2017/023316
PCT Pub. Date: Feb. 9, 2017

(65) Prior Publication Data
US 2018/0142133 A1    May 24, 2018

(51) Int. Cl.
*C09K 3/22* (2006.01)
*B01D 43/00* (2006.01)

(52) U.S. Cl.
CPC ............... *C09K 3/22* (2013.01); *B01D 43/00* (2013.01)

(58) Field of Classification Search
CPC . C09K 3/22; B01D 43/00; B05D 1/36; B05D 1/02; B05D 7/00; B05B 9/00
See application file for complete search history.

(56) References Cited

U.S. PATENT DOCUMENTS 3,063,800 A    11/1962  Dancy
5,328,497 A    7/1994   Hazlett
(Continued)

FOREIGN PATENT DOCUMENTS

WO    1998055560 A1    12/1998
WO    2015066283 A1    5/2015
(Continued)

OTHER PUBLICATIONS

Patent Cooperation Treaty; International Searching Authority, International Search Report dated May 4, 2016; International PCT Application No. PCT/US2015/043839.

*Primary Examiner* — Joseph D Anthony
(74) *Attorney, Agent, or Firm* — McGuire Woods LLP

(57) ABSTRACT

A method and a composition for suppressing and eliminating dust particulate. The composition includes an aqueous gelling solution, and a proppant particulate. The aqueous gelling solution and the proppant particulate are combined to create a mixture. The aqueous gelling solution and the proppant particulate may be combined using at least one of composition spraying the aqueous gelling solution, mist spraying the aqueous gelling solution, and atomized spraying aqueous gelling solution. The mixture may include around 0.1 weight percent to 5 weight percent w/v of the aqueous gelling solution. The gelling agent may include a suitable viscosifying polymer. The suitable viscosifying polymer may include at least one of natural polymers, derivatives of natural polymers, synthetic polymers, biopolymers, and any combination thereof, guar, xanthan, diutan, scleroglucan, high-molecular weight polysaccharides, any derivative thereof, and any combination thereof, hydropropyl guar (HPG), carboxymethyl guar (CMG), and carboxymethylhydroxypropyl guar (CMHPG).

25 Claims, 4 Drawing Sheets

(56) References Cited

U.S. PATENT DOCUMENTS

| | | | |
|---|---|---|---|
| 8,695,704 B2 | 4/2014 | Muthusamy et al. | |
| 2009/0090890 A1* | 4/2009 | Nguyen | C08K 5/101 252/88.1 |
| 2009/0189113 A1* | 7/2009 | Lamperd | C09K 3/22 252/88.1 |
| 2010/0297358 A1* | 11/2010 | Bytnar | C09K 3/22 427/427 |
| 2012/0135240 A1* | 5/2012 | Fan | C08F 220/18 428/407 |
| 2012/0177449 A1* | 7/2012 | Groeneveld | C09K 3/22 405/263 |
| 2014/0137616 A1 | 5/2014 | Peacock et al. | |
| 2015/0047848 A1 | 2/2015 | Bestaoui-Spurr et al. | |
| 2015/0060724 A1* | 3/2015 | Urschey | C09K 3/22 252/88.1 |
| 2015/0083415 A1 | 3/2015 | Monroe et al. | |
| 2015/0119301 A1* | 4/2015 | McDaniel | C09K 8/805 507/224 |
| 2015/0232730 A1* | 8/2015 | Zim | B05D 7/00 427/212 |
| 2015/0315459 A1* | 11/2015 | McDaniel | C09K 8/805 507/225 |
| 2015/0367363 A1* | 12/2015 | Hay | C05G 3/0088 239/1 |
| 2016/0251570 A1* | 9/2016 | Hook | C09K 8/805 507/225 |
| 2017/0088769 A1* | 3/2017 | Kesavan | C09K 8/68 |

FOREIGN PATENT DOCUMENTS

| | | |
|---|---|---|
| WO | 2015073292 A1 | 5/2015 |
| WO | 2016068928 A1 | 5/2016 |
| WO | 2016122456 A1 | 8/2016 |

\* cited by examiner

DUST CONTROL IN OIL FIELD APPLICATIONS

BACKGROUND

The present disclosure relates to a method and a composition for suppressing and eliminating dust particulate being generated from sand or proppant particulates during conveying of sand particulates to or from storage containers. More particularly, the present disclosure relates to a method and a composition for suppressing and eliminating dust particulate using aqueous natural or synthetic or polymer solution.

The dust suppression is the reduction of the extent to which finely divided solid particulate material becomes suspended in the air. A variety of materials such as, for example, sand, coal, sulfur, phosphate, clay, and other finely divided ores and minerals, generate dust in transfer and handling operations during mining, transportation, storage, and use.

Accordingly, it is an object of this invention to provide a novel method and a composition for suppressing and eliminating dust particulate being generated from sand or proppant particulates. The disclosed novel method and composition may be used during conveying of sand particulates to or from storage containers.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF ILLUSTRATIVE EMBODIMENTS

Figure 1A:
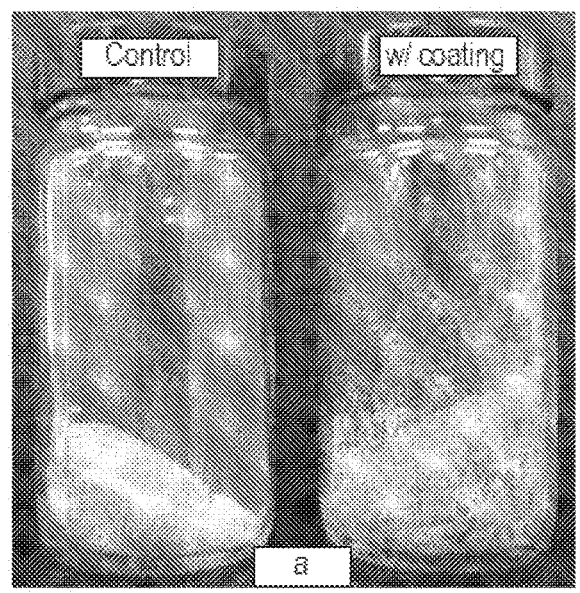
FIG. 1A illustrates a comparison of non-coated Brazos river sand vs. Brazos river sand that is coated with an example of a gelling agent solution in accordance with the present disclosure.
Figure 1B:
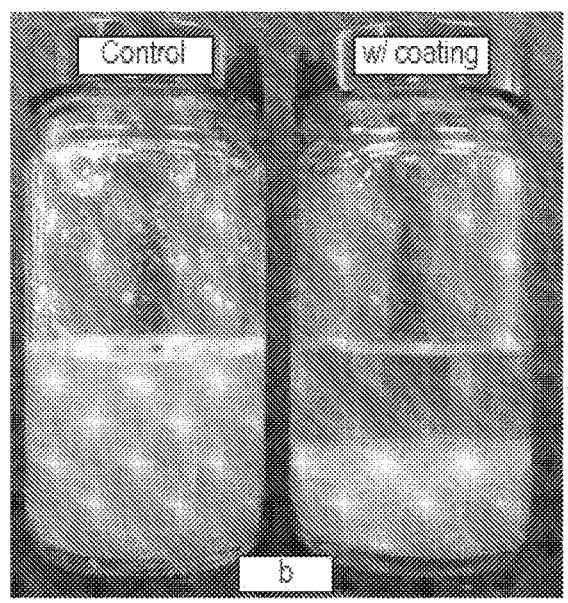
FIG. 1B illustrates a comparison of non-coated Brazos river sand with water added vs. Brazos river sand that is coated with an example of a gelling agent solution in accordance with the present disclosure with water added.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The present disclosure relates generally to a method and a composition for suppressing and eliminating dust particulate. The method and composition may include a combination of an aqueous gelling solution and proppant particulates. The method and composition may further include composition spraying of an aqueous gelling agent solution to proppant particulates, which coats a thin film onto the proppant particulates. The aqueous gelling agent solution suppresses the dust particles by encapsulating and sticking them onto the sand or proppant surfaces. Since the coated aqueous gelling agent solution will be part of fracturing fluid, there are no compatibility issues or any additional additive cost.

The dust particulate may be smaller in size than the proppant particulates.

In one embodiment of the present disclosure, the aqueous gelling agent solution may be applied to the proppant particulates as a mist or atomized into a dry flow stream of the sand or proppant particulates during their conveying.

In another embodiment of the present disclosure, the aqueous gelling agent solution may be coated at least partially with a concentration of 0.1-5% v/w (10-30 lb/1000 gal gelling agent solution).

In another embodiment of the present disclosure, the gelling agent may be comprised of guar, derivatized guar, derivatized cellulose, synthetic polymers, etc.

The aqueous gelling solution may include suitable viscosifying polymers, such as, for example, natural polymers, derivatives of natural polymers, synthetic polymers, biopolymers, and the like, and any combination thereof. The suitable viscosifying polymers may further include guar, xanthan, diutan, scleroglucan, high-molecular weight polysaccharides, and the like, and any derivative thereof, and any combination thereof. Particularly suitable viscosifying polymers may include hydropropyl guar (HPG), carboxymethyl guar (CMG), and carboxymethylhydroxypropyl guar (CM-HPG). Cellulose derivatives such as hydroxyethylcellulose (HEC), hydroxypropylcellulose (HPC), carboxymethylcellulose (CMC), or carboxymethylhydroxyethylcellulose (CMHEC) may also be suitable viscosifying polymers. Synthetic polymers such as, for example, polyacrylamide and polyacrylate polymers, polyvinyl alcohol, polyethylene glycol, polypropylene glycol, the like, and copolymers thereof may also be suitable viscosifying polymers for use in a fracturing fluid.

The proppant particulates may include, e.g., sand, treated sand, man-made ceramic materials, and the like.

The composition and methods described herein assist in suppressing and eliminating dust particulate without, e.g., additional dust control additive. The composition and method as described herein also improves operational simplicity since the gelling agent prepared for fracturing fluid formulation will be used, therefore making transition of this technology to the field facile.

A lab test was carried out with control containing non-coated Brazos river sand v. Brazos river sand that is coated with an example of disclosed gelling agent (shown in FIG. 1A). A lab test for comparison of non-coated Brazos river sand with water added vs. Brazos river sand that is coated with an example of a gelling agent solution with water added was also carried out (shown in FIG. 2A).

Figure 1C:
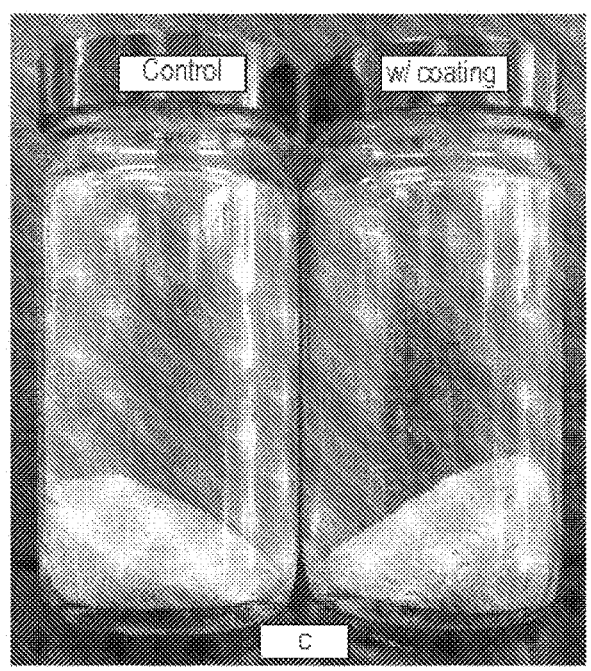
FIG. 1C illustrates a flowability of control vs. Brazos river sand that is coated with an example of a gelling agent solution in accordance with the present disclosure.

FIG. 1C illustrates a flowability of control vs. Brazos river sand that is coated with an example of a gelling agent solution. The gelling agent solution coated sand was dried in the oven, and it did not form any clumps and maintained flowability.

Figure 2:
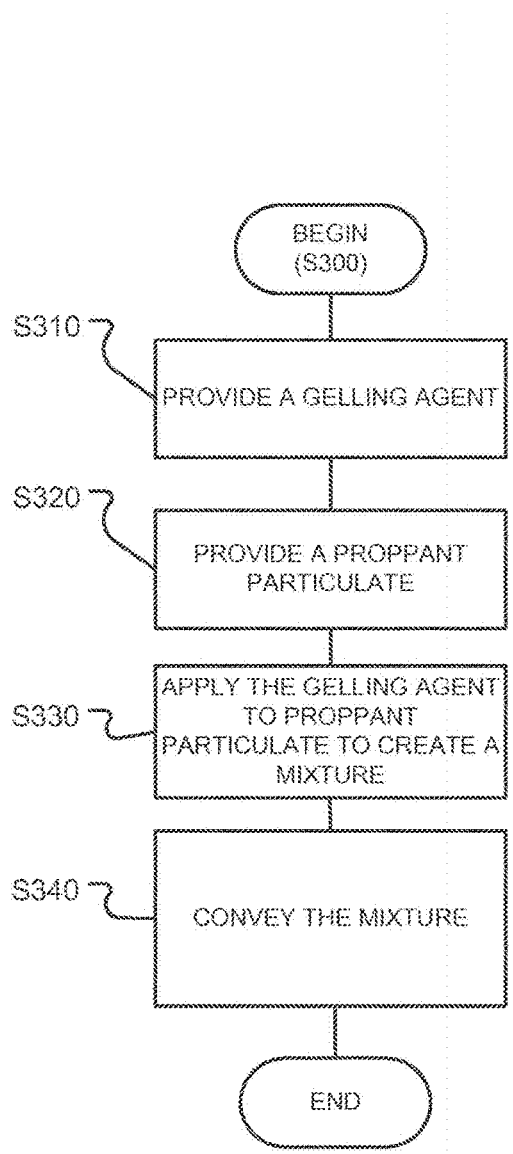
FIG. 2 illustrates an example of a method for suppressing and eliminating dust particulate in accordance with the present disclosure.

FIG. 2 illustrates an example of a method for suppressing and eliminating dust particulate being generated from sand or proppant particulates. The method may include providing a gelling agent (Step 310), and a proppant particulate (Step 320). The gelling agent and the proppant particulate may be mixed together by, e.g., shear mixing, spraying, applying as a mist or atomized into a dry flow stream, and the like, to create a mixture (Step 330). After mixing, the mixture may be used in conveying of sand particulates to or from the storage containers (Step 340). The mixture may be mixed for a predetermined amount of time. Since the gelling agent will be applied in any case for preparing fracturing fluid formulation, the method as disclosed herein (1) suppresses the dust particulate; and (2) eliminates a need for additional dust control additive.

The predetermined amount of time may include, e.g., 1 min, 5 min, 10 min, or any other definite amount of time.

During storage, transportation, and use of proppant particulates, it is important to minimize dust particulates for health, safety, and environmental reasons. The present disclosure describes a composition and method that allows suppression and elimination of dust particulate being generated from proppant particulates without additional dust suppressant.

In addition to the embodiments described above, many examples of specific combinations are within the scope of the disclosure, some of which are detailed below.

In an aspect of the present disclosure, a method for suppressing and/or eliminating dust particulate is disclosed. The method includes providing an aqueous gelling agent solution; providing a proppant particulate that includes dust particulate; applying the aqueous gelling agent solution to the proppant particulate encapsulating the dust particulate onto a surface of the proppant particulate creating a mixture; and conveying the mixture to or from a storage container.

The method may further include mixing the mixture for a predetermined amount of time prior to conveying the mixture to or from the storage container.

The method may further include utilizing a mixer for mixing the mixture.

The method may further include pumping the mixture into a subterranean formation.

The method may further include utilizing a pump for pumping the mixture.

The method may further include placing the proppant into a fracture in a subterranean formation.

The applying step may include spraying the aqueous gelling agent solution onto the proppant particulate.

The applying step may include applying the aqueous gelling agent solution onto the proppant particulate as a mist.

The mixture may include around 0.1 percent volume by weight to 5 percent volume by weight of the aqueous gelling solution to the proppant particulate.

The gelling agent may include a viscosifying polymer. The viscosifying polymer may include at least one of natural polymers, derivatives of natural polymers, synthetic polymers, biopolymers, and any combination thereof.

The viscosifying polymer may include at least one of hydropropyl guar (HPG), carboxymethyl guar (CMG), and carboxymethylhydroxypropyl guar (CMHPG).

The viscosifying polymer may include at least one of hydroxyethylcellulose (HEC), hydroxypropylcellulose (HPC), carboxymethylcellulose (CMC), or carboxymethylhydroxyethylcellulose (CMHEC).

The viscosifying polymer may include at least one of polyacrylamide and polyacrylate polymers, polyvinyl alcohol, polyethylene glycol, polypropylene glycol, and copolymers thereof.

The proppant particulate may include at least one of natural sand, resin-coated sand, crushed nut hulls, polymer beads, and man-made ceramic materials.

In another aspect of the present disclosure, a method for suppressing and/or eliminating dust particulate is disclosed. The method includes providing an aqueous gelling agent solution; providing a proppant particulate that includes dust particulate; applying the aqueous gelling agent solution to the proppant particulate encapsulating the dust particulate onto a surface of the proppant particulate creating a mixture; mixing the mixture for a predetermined amount of time; and conveying the mixture to or from a storage container.

The method may further include utilizing a mixer for mixing the mixture.

The method may further include pumping the mixture into a subterranean formation.

The method may further include utilizing a pump for pumping the mixture.

The method may further include placing the proppant particulate into a fracture in a subterranean formation.

The applying step may include spraying the aqueous gelling agent solution onto the proppant particulate.

The mixture may include around 0.1 percent volume by weight to 5 percent volume by weight of the aqueous gelling solution to the proppant particulate. For example, 3% v/w is 3 mL of the aqueous gelling solution per 100 grams of the proppant particulate.

The aqueous gelling agent may include a viscosifying polymer. The viscosifying polymer may include at least one of hydropropyl guar (HPG), carboxymethyl guar (CMG), and carboxymethylhydroxypropyl guar (CMHPG).

The viscosifying polymer may include at least one of hydroxyethylcellulose (HEC), hydroxypropylcellulose (HPC), carboxymethylcellulose (CMC), or carboxymethylhydroxyethylcellulose (CMHEC).

The viscosifying polymer may include at least one of polyacrylamide and polyacrylate polymers, polyvinyl alcohol, polyethylene glycol, polypropylene glycol, and copolymers thereof.

The viscosifying polymer may include at least one of guar, derivatized guar, derivatized cellulose, and synthetic polymers.

In yet another aspect of the present disclosure, a composition for suppressing and/or eliminating dust particulate that includes a mixture is disclosed. The mixture includes an aqueous gelling solution including a viscosifying polymer; and a proppant particulate that includes dust particulate, wherein the mixture includes around 0.1 percent volume by weight to 5 percent volume by weight of the aqueous gelling solution to the proppant particulate.

It should be apparent from the foregoing that embodiments of the invention having significant advantages have been provided. While the embodiments are shown in only a few forms, the embodiments are not limited but are susceptible to various changes and modifications without departing from the spirit thereof.

We claim:

1. A method for suppressing and/or eliminating dust particulate comprising:
    providing an aqueous gelling agent solution;
    providing a proppant particulate that includes dust particulate;
    applying the aqueous gelling agent solution to the proppant particulate by spraying, applying as a mist, or atomizing into a dry flow stream for a time of one minute or greater to encapsulate the dust particulate onto a surface of the proppant particulate thereby creating a mixture; and
    conveying the mixture to or from a storage container.

2. The method of claim 1, further comprising:
    wherein the applying the aqueous gelling agent solution to the proppant particulate is performed prior to conveying the mixture to or from the storage container.

3. The method of claim 2, further comprising pumping the mixture into a subterranean formation.

4. The method of claim 3, further comprising:
    utilizing a pump for pumping the mixture.

5. The method of claim 2, further comprising:
    placing the proppant particulate into a fracture in a subterranean formation.

6. The method of claim 1, wherein the applying step comprises: spraying the aqueous gelling agent solution onto the proppant particulate.

7. The method of claim 1, wherein the applying step comprises:
    applying the aqueous gelling agent solution onto the proppant particulate as a mist.

8. The method of claim 1, wherein the mixture comprises around 0.1 percent volume by weight to 5 percent volume by weight of the aqueous gelling solution to the proppant particulate.

9. The method of claim 1, wherein the gelling agent comprises a viscosifying polymer.

10. The method of claim 9, wherein the viscosifying polymer comprises at least one of natural polymers, derivatives of natural polymers, synthetic polymers, biopolymers, and any combination thereof.

11. The method of claim 9, wherein the viscosifying polymer comprises at least one of hydropropyl guar (HPG), carboxymethyl guar (CMG), and carboxymethylhydroxypropyl guar (CMHPG).

12. The method of claim 9, wherein the viscosifying polymer comprises at least one of hydroxyethylcellulose (HEC), hydroxypropylcellulose (HPC), carboxymethylcellulose (CMC), or carboxymethylhydroxyethylcellulose (CMHEC).

13. The method of claim 9, wherein the viscosifying polymer comprises at least one of polyacrylamide and polyacrylate polymers, polyvinyl alcohol, polyethylene glycol, polypropylene glycol, and copolymers thereof.

14. The method of claim 1, wherein the proppant particulate comprises at least one of natural sand, resin-coated sand, crushed nut hulls, polymer beads, and man-made ceramic materials.

15. A method for suppressing and/or eliminating dust particulate comprising: providing an aqueous gelling agent solution;
    providing a proppant particulate that includes dust particulate;
    applying the aqueous gelling agent solution to the proppant particulate by spraying, applying as a mist, or atomizing into a dry flow stream for a time of one minute or greater to encapsulate the dust particulate onto a surface of the proppant particulate thereby creating a mixture;
    conveying the mixture to or from a storage container; and
    utilizing a pump for pumping the mixture.

16. The method of claim 15, further comprising: utilizing a mixer for mixing the mixture.

17. The method of claim 15, further comprising pumping the mixture into a subterranean formation.

18. The method of claim 15, further comprising: placing the proppant particulate into a fracture in a subterranean formation.

19. The method of claim 15, wherein the applying step comprises: spraying the aqueous gelling agent solution onto the proppant particulate.

20. The method of claim 15, wherein the mixture comprises around 0.1 percent volume by weight to 5 percent volume by weight of the aqueous gelling solution to the proppant particulate.

21. The method of claim 15, wherein the aqueous gelling agent comprises a viscosifying polymer.

22. The method of claim 21, wherein the viscosifying polymer comprises at least one of hydropropyl guar (HPG), carboxymethyl guar (CMG), and carboxymethylhydroxypropyl guar (CMHPG).

23. The method of claim 21, wherein the viscosifying polymer comprises at least one of hydroxyethylcellulose (HEC), hydroxypropylcellulose (HPC), carboxymethylcellulose (CMC), or carboxymethylhydroxyethylcellulose (CMHEC).

24. The method of claim 21, wherein the viscosifying polymer comprises at least one of polyacrylamide and polyacrylate polymers, polyvinyl alcohol, polyethylene glycol, polypropylene glycol, and copolymers thereof.

25. The method of claim 21, wherein the viscosifying polymer comprises at least one of guar, derivatized guar, derivatized cellulose, and synthetic polymers.

* * * * *